United States Patent
Chujo

[11] Patent Number: 6,148,112
[45] Date of Patent: Nov. 14, 2000

[54] DIGITAL IMAGE CORRECTION DEVICE AND DISPLAY DEVICE

[75] Inventor: Takeshi Chujo, Tokyo, Japan

[73] Assignee: Mitsubishi Denki Kabushiki Kaisha, Tokyo, Japan

[21] Appl. No.: 08/971,979

[22] Filed: Nov. 17, 1997

[30] Foreign Application Priority Data

Jul. 14, 1997 [JP] Japan ..................... 9-188673

[51] Int. Cl.[7] ................................... G06K 9/40
[52] U.S. Cl. .................. 382/254; 382/255; 382/274; 315/368.11; 315/368.12; 348/806; 348/807
[58] Field of Search .................... 382/254, 255, 382/274, 305; 313/412; 315/368.11, 368.12; 348/806, 807; 345/507, 509, 10, 24

[56] References Cited

U.S. PATENT DOCUMENTS

| | | | |
|---|---|---|---|
| 5,298,985 | 3/1994 | Tsujihara et al. | 315/368.11 |
| 5,398,083 | 3/1995 | Tsujihara et al. | 348/807 |
| 5,592,240 | 1/1997 | Sakamoto et al. | 315/368.11 |
| 5,751,122 | 5/1998 | Park | 348/807 |
| 5,793,447 | 8/1998 | Fujiwara et al. | 348/807 |

FOREIGN PATENT DOCUMENTS 63-246928  10/1988  Japan.
7-288830  10/1995  Japan.

Primary Examiner—Thomas D. Lee
Attorney, Agent, or Firm—Burns, Doane, Swecker & Mathis, LLP

[57] ABSTRACT

A digital image correction device in which correction data at correction points corresponding one by one to positions on a CRT screen displayed by raster scanning system is stored as a relation pattern expressing the relative relation with the correction data of the adjacent correction point as one-bit data such as UP/DOWN, and on the basis of this relation pattern, a correction signal is generated for boosting, lowering or holding the voltage of the correction signal at each correction point as compared with the voltage at the adjacent correction point.

20 Claims, 12 Drawing Sheets

CONVERGENCE
CORRECTION DATA ⇒ EVEN FIELD
(1 BYTE DATA)      CORRECTION DATA

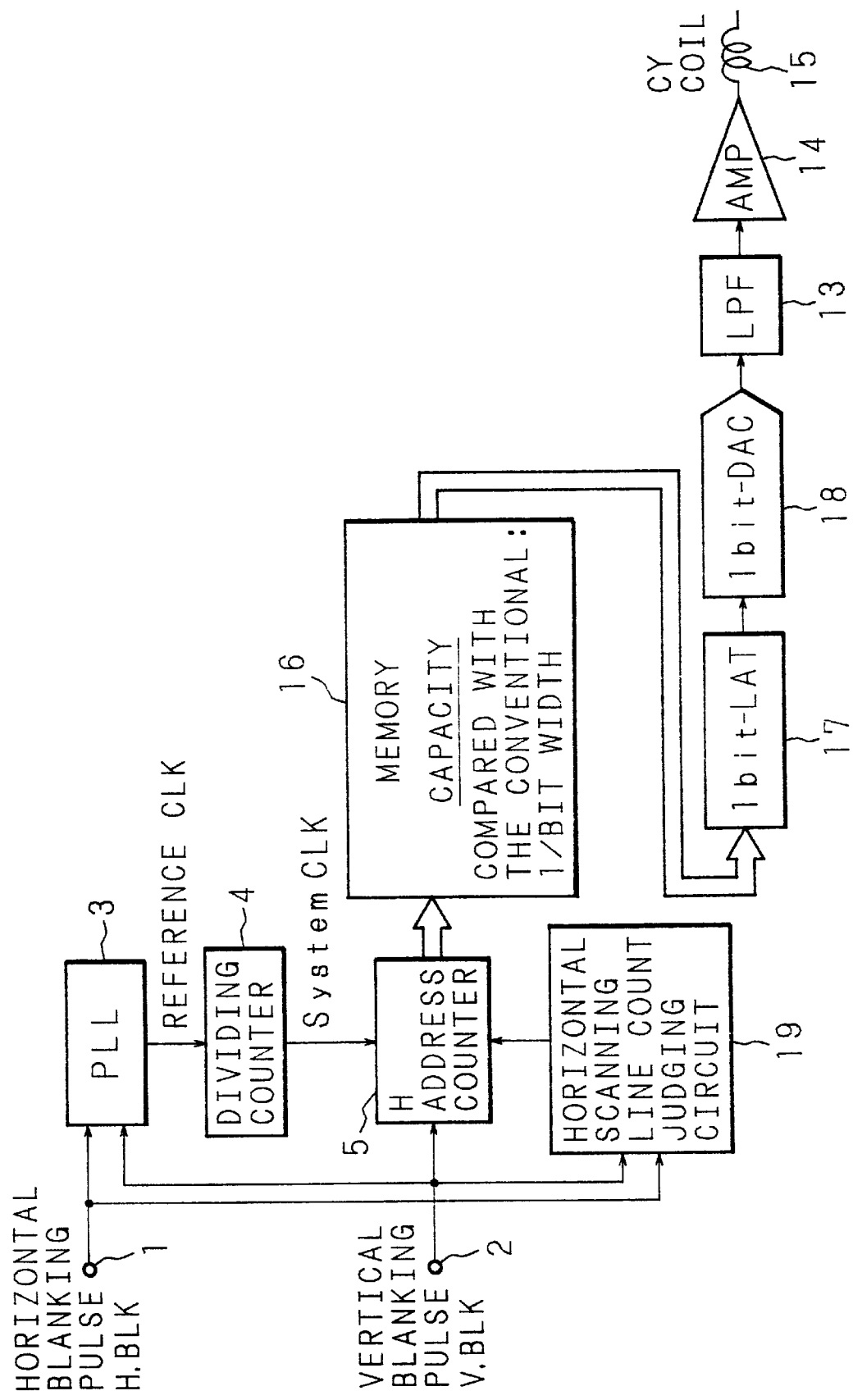

FIG. 4A
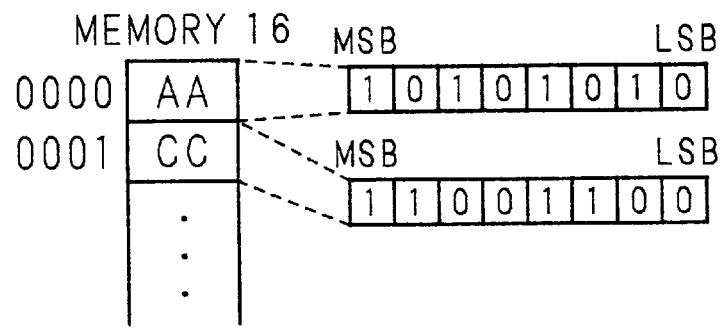
FIG. 4B
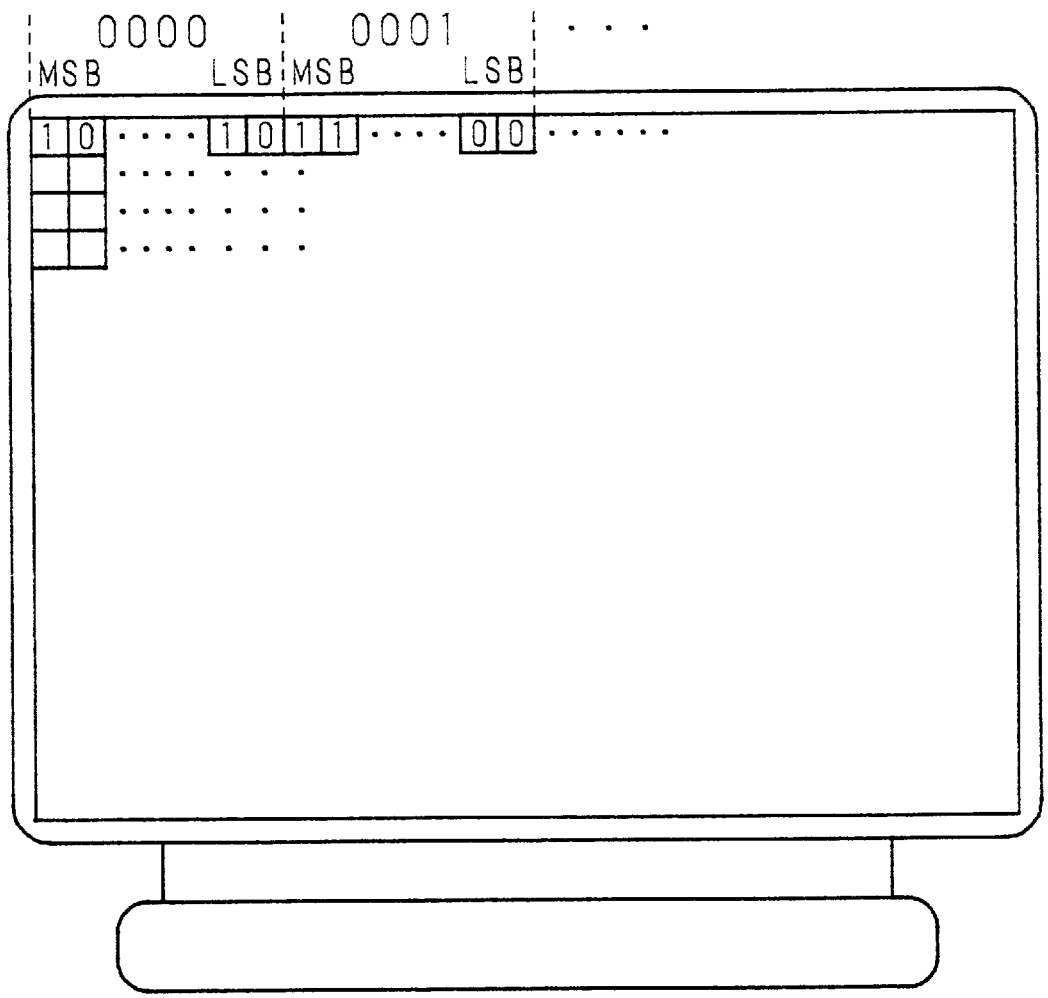

FIG. 9A
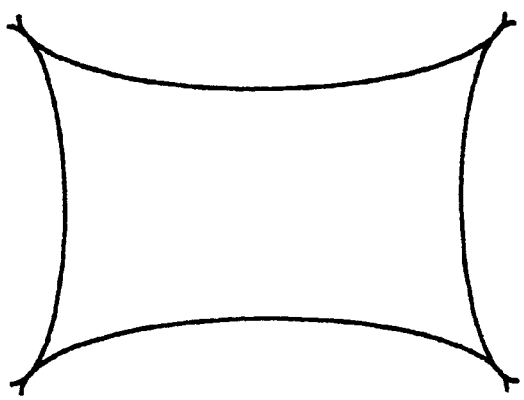
UNCORRECTED
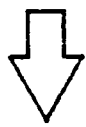
FIG. 9B
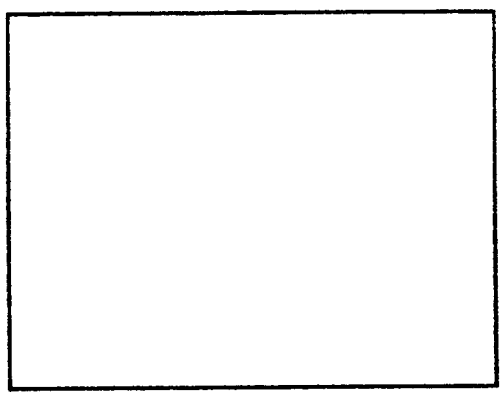
CORRECTED

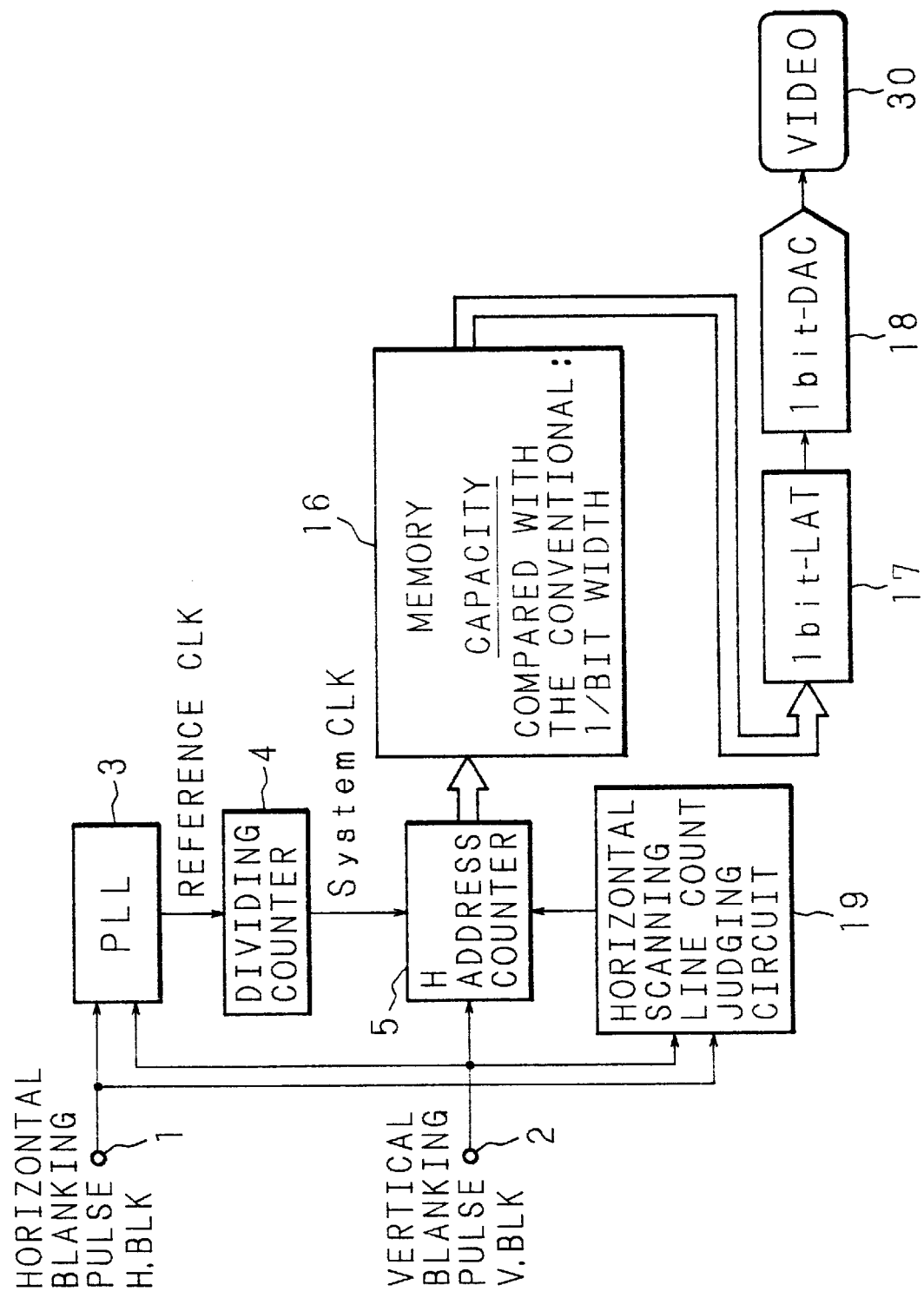

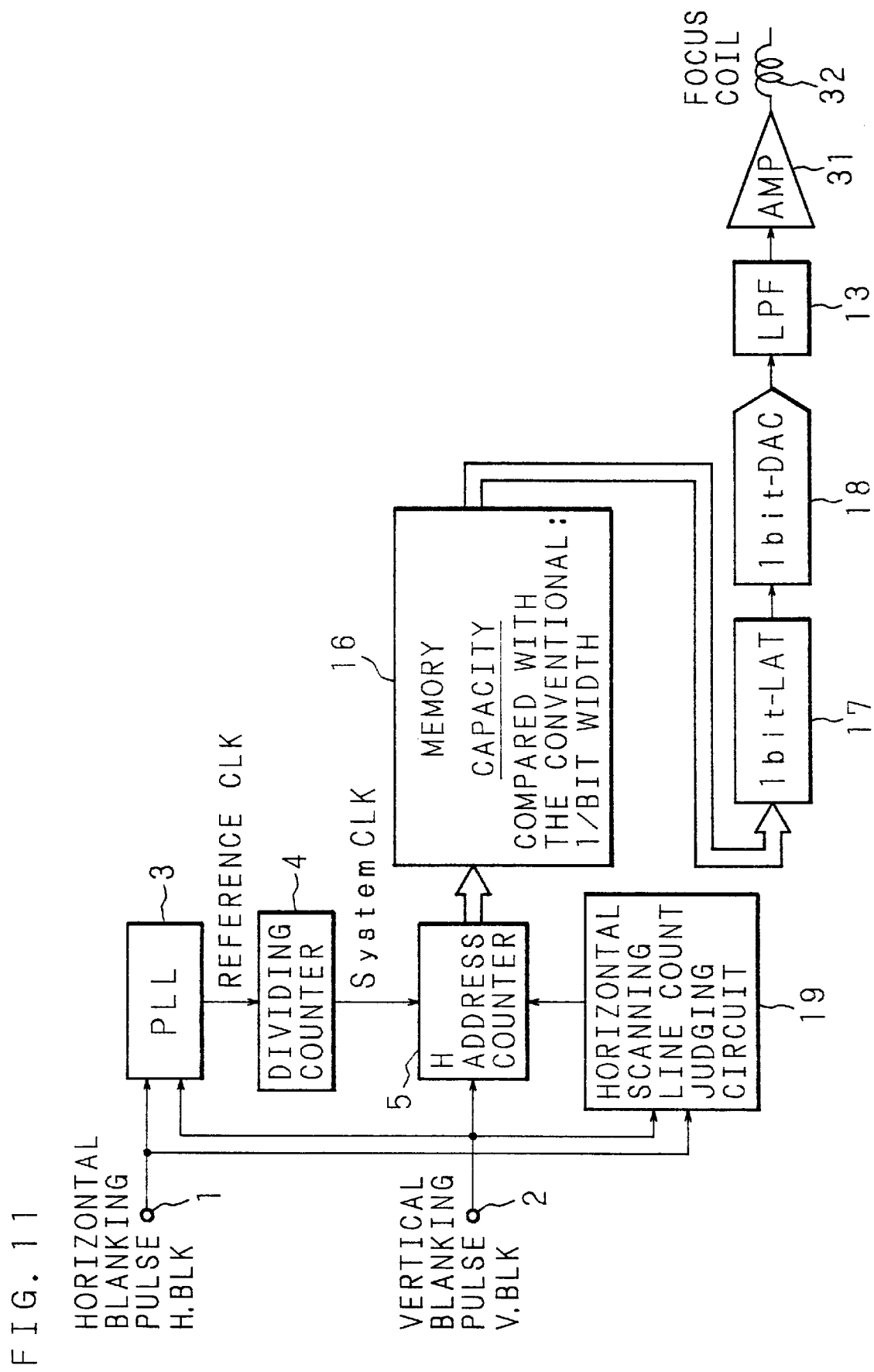

DIGITAL IMAGE CORRECTION DEVICE
AND DISPLAY DEVICE

BACKGROUND OF THE INVENTION

The present invention relates to a display device of a television receiver or the like using the CRT, and more particularly to a digital image correction device for correcting convergence and graphic distortion on the screen, and a display device comprising such digital image correction device.

FIG. 1 is a block diagram showing a structural example of a conventional digital image correction device disclosed in Japanese Patent Application Laid-open No. 7-288830. This digital image correction device comprises an input terminal 1 for receiving a horizontal blanking pulse, an input terminal 2 for receiving a vertical blanking pulse, a phase locked loop (PLL) 3 and a field judging circuit 7 connected to the input terminals 1, 2, a dividing counter 4 receiving a reference clock from the PLL 3, and an H address counter 5 connected to the input terminal 2 for receiving a system clock from the dividing counter 4.

This digital image correction device further comprises a memory 6 connected to the H address counter 5, a latch circuit 8 connected to the memory 6, an average calculation circuit 9 connected to the memory 6 and latch circuit 8, and a switch circuit 10 connected to the memory 6, average calculation circuit 9, and field judging circuit 7.

The digital image correction device also comprises a latch circuit 11 connected to the switch circuit 10, a digital/analog converter (D/A converter or DAC) 12 connected to the latch circuit 11, a low pass filter (LPF) 13 connected to the D/A converter 12, an amplifier (AMP) 14 connected to the LPF 13, and a convergence yoke coil (CY coil) 15 connected to the amplifier 14.

In thus constituted digital image correction device, the operation is described below.

In advance, the convergence correction amount required at each point on the screen as shown in FIG. 2B is stored as convergence correction data in the memory 6 (0000, 0001, . . . ; address) in the unit of 1 byte as shown in FIG. 2A. In synchronism with raster scanning in the CRT, the convergence correction data of each point is read out sequentially from the first horizontal scanning line on the screen. The convergence correction data being read out is converted into analog data in the D/A converter 12, and data are interpolated by the LPF 13 to be a continuous convergence correction signal, which is amplified by the amplifier 14 to drive the CY coil 15.

As a result, in the CRT, the convergence correction magnetic field for correcting the convergence at each point on the screen is generated from the CY coil 15.

From the input terminal 1, a horizontal blanking pulse H. BLK of horizontal deflection frequency fH synchronized with raster scanning in the CRT is fed, and from the input terminal 2, a vertical blanking pulse V. BLK of vertical deflection frequency fV synchronized with raster scanning in the CRT is fed.

The PLL 3 generates a reference clock of the multiplied horizontal blanking pulse H. BLK, and the dividing counter 4 supplies the H address counter 5 with a system clock for always keeping constant the frequency division in the horizontal direction in synchronism with the reference clock.

The H address counter 5, receiving the vertical blanking pulse V. BLK, generates a read address corresponding to the horizontal and vertical time phase (corresponding to the position on the screen).

Accordingly, the convergence correction amount required at each point (convergence correction point) necessary for convergence correction on the screen can be individually controlled, and a convergence correction signal having a specified waveform can be obtained.

The field judging circuit 7 receives the horizontal blanking pulse H. BLK from the input terminal 1, and the vertical blanking pulse V. BLK from the input terminal 2. From the phase relation of the horizontal blanking pulse H. BLK and vertical blanking pulse V. BLK, the field judging circuit 7 judges odd and even fields, and controls the switch circuit 10 depending on the judging result.

The switch circuit 10 closes to the X side in the case of even field, and to the Y side in the case of odd field.

In the memory 6, on the other hand, only the convergence correction data of a convergence correction point on the even field screen is stored preliminarily. The convergence correction data read out from the memory 6 is supplied to the X side of the switch circuit 10 and the latch circuit 8.

In the latch circuit, the supplied convergence correction data is delayed by one horizontal period. The convergence correction data output from the latch circuit 8 is supplied to the average calculation circuit 9, and the average with the convergence correction data being read out by delay of two horizontal periods from the memory 6 is calculated.

Accordingly, the convergence correction data supplied simultaneously to the average calculation circuit 9 are convergence correction data at individual convergence correction points in two adjacent horizontal scanning lines of the even field, and hence their average convergence correction data is obtained. This averaged convergence correction data is fed to the Y side of the switch circuit 10.

Therefore, in the even field, the convergence correction data being read out from the memory 6 directly passes through the switch circuit 10, and is sequentially latched by the latch circuit 11, and in the case of odd field, by the switch circuit 10, the averaged convergence correction data from the average calculation circuit 9 is selected as the convergence correction data of odd field, and is sequentially latched by the latch circuit 11.

The convergence correction data output from the latch circuit 11 is converted into analog convergence correction data by the D/A converter 12, and data are interpolated by the LPF 13 to be continuous convergence correction signal, which is amplified by the amplifier 14 and is supplied into the CY coil 15.

Thus, according to the prior art, the convergence correction data only in the even field out of odd and even fields, is stored in the memory 6. In the odd field, the convergence correction data at convergence correction points in adjacent two horizontal scanning lines in the even field are averaged to obtain convergence correction data, and therefore the memory 6 is reduced in necessary capacity as compared with the case of storing all convergence correction data in the odd and even fields preliminarily in the memory 6.

The same holds true also in other operations than convergence correction, and in graphic distortion correction, white balance and uneven luminance correction, and focus correction, individually, correction data of graphic distortion, correction data of white balance and uneven luminance, and correction data of focus are stored in the memory, and each correction is performed by installing the graphic distortion correction circuit, white balance and uneven luminance correction circuit, or focus correction circuit, instead of the magnetic field generating circuit for convergence correction (amplifier 14, CY coil 15).

In the conventional digital image correction device, as mentioned above, since a circuit for reducing the necessary capacity of the memory 6 is needed, the circuit composition is complicated, and when the number of horizontal scanning lines is changed, that is, when the frequency of the synchronizing signal is changed, there was a limit in the memory capacity for storing the correction data to be supplied corresponding to the increased horizontal scanning lines in order to keep the precision of correction, and there were also other cost problems by the constitution.

Moreover, to enhance the correction precision, it is necessary to raise the resolution of the signal fed into the D/A converter, but when this resolution is raised, a more expensive D/A converter is needed, and the number of bits per correction data stored in the memory increases, and a more expensive memory is required, which causes to raise the cost of the digital image correction device.

BRIEF SUMMARY OF THE INVENTION

The invention is devised in the light of the above background, and it is hence an object thereof to present a digital image correction device and a display device sufficiently reduces the memory in capacity and lowers the cost.

According to the digital image correction device of the invention, correction data for correcting the image convergence, graphic distortion, white balance and uneven luminance, or focus is stored in the memory as a relation pattern expressing the relative relation with the correction data of adjacent image correction point to be scanned previous to each image correction point in one-bit data, and the correction data is read out from the memory in synchronism with the raster scan on the screen, and the correction signal at the image correction point is created on the basis of the relation pattern with the adjacent one-bit data of the correction data, thereby correcting the image on the basis of this correction signal.

Therefore, the image can be corrected only by storing the one-bit correction data in every image correction point. Hence, without lowering the precision of the image correction, the memory capacity can be substantially saved, and the circuit for reducing the necessary capacity of the memory is not needed, so that the digital image correction device for image correction can be presented at low cost.

Also in the digital image correction device of the invention, the one-bit data is stored in the memory as parallel data of a specific number of bits, the parallel data output from the memory is temporarily stored in the memory circuit, and output as bit serial data. Therefore, as compared with the prior art of using the memory of plural bit widths and digital/analog converter, the capacity of the necessary memory and the address are substantially curtailed to 1/bit width. Hence, the electronic circuit for reducing the necessary memory capacity is not needed, and a digital image correction device of low cost parts can be presented.

Moreover, in the digital image correction device of the invention, from the system clock, two timing signals are created for respectively latching the adjacent one-bit data of bit serial data output from the shift register. Two latch circuits latch the adjacent one-bit data respectively by the created timing signals. The two latch circuits produce voltage signals for boosting, lowering or holding the correction signal voltage on the basis of the relative relation of the adjacent one-bit data latched respectively. An integrating circuit integrates the output voltage signal, and outputs the correction signal voltage by boosting, lowering or holding.

Accordingly, a necessary correction signal voltage can be obtained from the bit serial data, and as compared with the prior art of using the memory of plural bit widths and digital/analog converter, the necessary capacity of the memory is substantially curtailed to 1/bit width. Hence, the electronic circuit for reducing the necessary memory capacity is not needed, and a digital image correction device of low cost parts can be presented.

Further in the digital image correction device of the invention, the correction data corresponding to each horizontal scanning line of the horizontal scanning lines judged on the basis of the relation between the number of horizontal scanning lines and the number of horizontal scanning lines per frame of which correction data stored in the memory is read out from the memory with duplicating or decimating.

Hence, if the frequency of the synchronizing signal is changed, and the number of horizontal scanning lines increases, the correction data corresponding to the increased number of horizontal scanning lines can be supplied, and the precision of correction can be maintained.

The above and further objects and features of the invention will more fully be apparent from the following detailed description with the accompanying drawings.

BRIEF DESCRIPTION OF THE SEVERAL VIEWS OF THE DRAWINGS

FIG. 3 is a block diagram showing a constitution of a first embodiment of a digital image correction device of the invention;

FIGS. 4A and 4B are diagrams for explaining the convergence correction data at each point on the CRT screen, in the digital image correction device of the invention;

FIGS. 9A and 9B are diagrams for explaining the operation of the digital image correction device shown in FIG. 8;

FIG. 10 is a block diagram showing a constitution of a third embodiment of a digital image correction device of the invention;

FIG. 11 is a block diagram showing a constitution of a fourth embodiment of a digital image correction device of the invention.

DETAILED DESCRIPTION OF THE INVENTION

[Embodiment 1]

Figure 1:
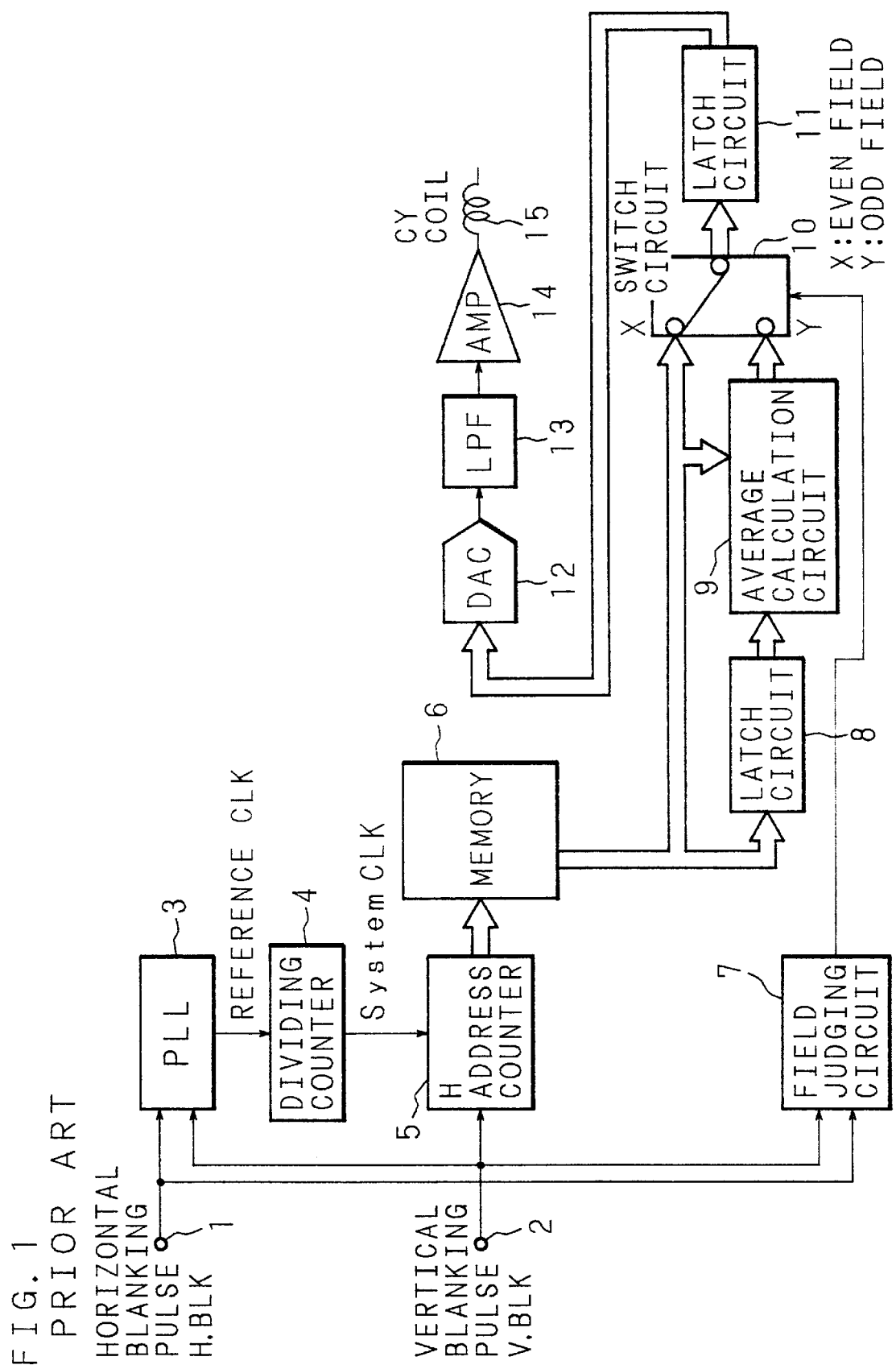
FIG. 1 is a block diagram showing a structural example of a conventional digital image correction device.
Figure 2A:
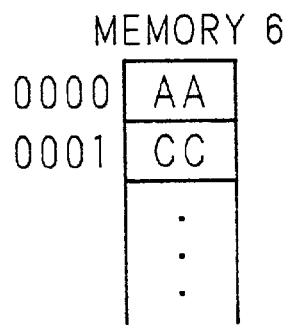
FIGS. 2A and 2B are diagrams for explaining the convergence correction data at each point on the CRT screen, in the conventional digital image correction device.
Figure 2B:
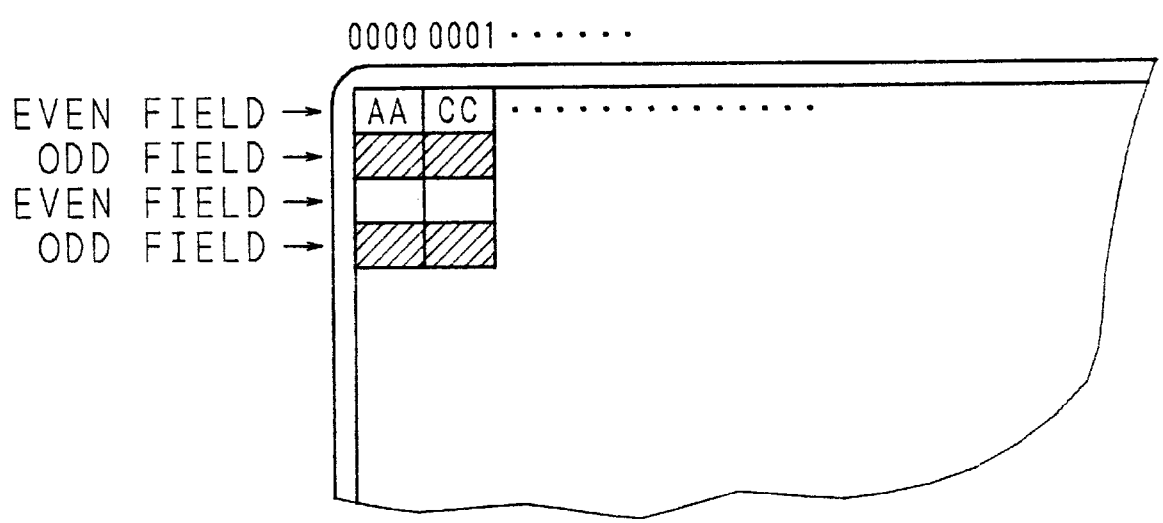

FIG. 3 is a block diagram showing a constitution of a first embodiment of a digital image correction device of the invention. This digital image correction device comprises an input terminal 1 for receiving a horizontal blanking pulse, an input terminal 2 for receiving a vertical blanking pulse, a phase locked loop (PLL) 3 and a horizontal scanning line count judging circuit 19 connected to the input terminals 1, 2, a dividing counter 4 receiving a reference clock from the PLL 3, and an H address counter 5 connected to the input terminal 2 for receiving a system clock from the dividing counter 4.

This digital image correction device further comprises a memory 16 connected to the H address counter 5 for storing the convergence correction amount necessary at each point on the CRT screen as one-bit data at every point, a one-bit latch circuit (1 bit-LAT) 17 connected to the memory 16, a one-bit digital/analog converter (1 bit-DAC) 18 connected to the one-bit latch circuit 17, a low pass filter (LPF) 13 connected to the one-bit digital/analog converter 18, an amplifier (AMP) 14 connected to the LPF 13, and a convergence yoke coil (CY coil) 15 connected to the amplifier 14.

In thus constituted digital image correction device, the operation is described below.

In advance, the convergence correction amount required at each point on the screen as shown in FIG. 4B is stored as convergence correction data in the memory 16 as one-bit up/down data at every point as shown in FIG. 4A (provided that 1 byte is stored in every address 0000, 0001, . . . , and eight points of every address correspond to the order from MSB to LSB). In synchronism with raster scanning in the CRT, the convergence correction data of each point is read out sequentially from the first horizontal scanning line on the CRT screen by 1 byte.

The convergence correction data of 1 byte being read out is converted into bit serial up/down data by the one-bit latch circuit 17, and the up/down data is converted into analog data in the one-bit digital/analog converter 18.

The analog data converted by the one-bit digital/analog converter 18 are interpolated by the LPF 13 to be a continuous convergence correction signal, which is amplified by the amplifier 14, and is supplied to the CY coil 15.

As a result, in the CRT, the convergence correction magnetic field for correcting the convergence at each point on the screen is generated from the CY coil 15.

At this time, from the input terminal 1, a horizontal blanking pulse H. BLK of horizontal deflection frequency fH synchronized with raster scanning in the CRT is fed, and from the input terminal 2, a vertical blanking pulse V. BLK of vertical deflection frequency fV synchronized with raster scanning in the CRT is fed.

The PLL 3 generates a reference clock of the multiplied horizontal blanking pulse H. BLK, and the dividing counter 4 supplies the H address counter 5 with a system clock for always keeping constant the frequency division in the horizontal direction in synchronism with the reference clock.

The H address counter 5, receiving the vertical blanking pulse V. BLK, generates a read address corresponding to the horizontal and vertical time phase (corresponding to the position on the screen).

The horizontal scanning line count judging circuit 19 judges the number of horizontal scanning lines in one frame of the video signal to be displayed on the CRT screen, and controls to output the read address to be supplied to the memory 16. That is, since the frequency of the synchronizing signal is changed, the density of the horizontal scanning lines in one frame varies, as compared with the convergence correcting data stored in the memory 16, for example, corresponding to the (standard) 525 horizontal scanning lines in one frame, if the judged number of horizontal scanning lines is, for example, 750, it is controlled to read by repeating twice as for the average dispersed 225 lines in the convergence correction data in the memory 16. If the number of judged horizontal scanning lines is 400, it is controlled to read by decimating as for the average dispersed 125 lines.

Figure 5:
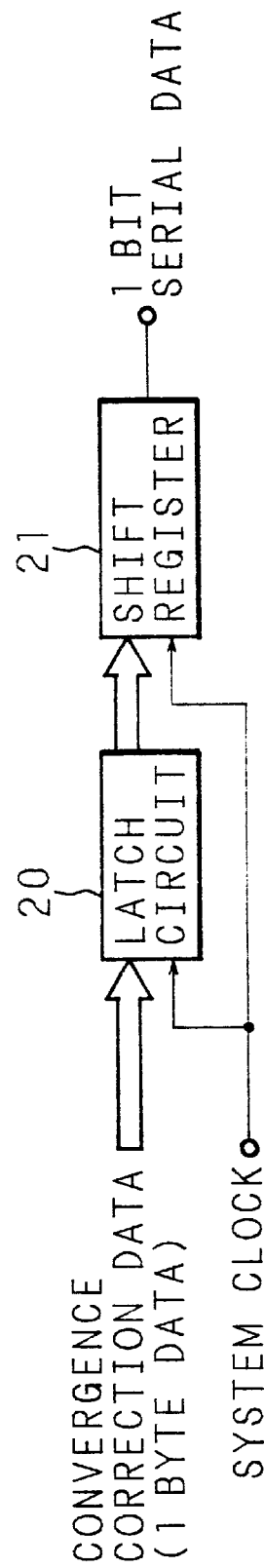
FIG. 5 is a block diagram showing a structural example of a one-bit latch circuit.

FIG. 5 is a block diagram showing a structural example of the one-bit latch circuit 17. The one-bit latch circuit 17 comprises a latch circuit 20 for latching the convergence correction data in synchronism with the system clock by 1 byte being read out from the memory 16, and a shift register 21 for converting the convergence correction data of 1 byte latched by the latch circuit 20, into bit serial data in synchronism with the system clock.

In thus constituted one-bit latch circuit 17, the latch circuit 20 latches the convergence correction data by 1 byte read from the memory 16 in synchronism with the system clock. Then, the convergence correction data of 1 byte latched by the latch circuit 20 is converted into bit serial data as the shift register 21 shifts and outputs the correction data in synchronism with the system clock.

Figure 6:
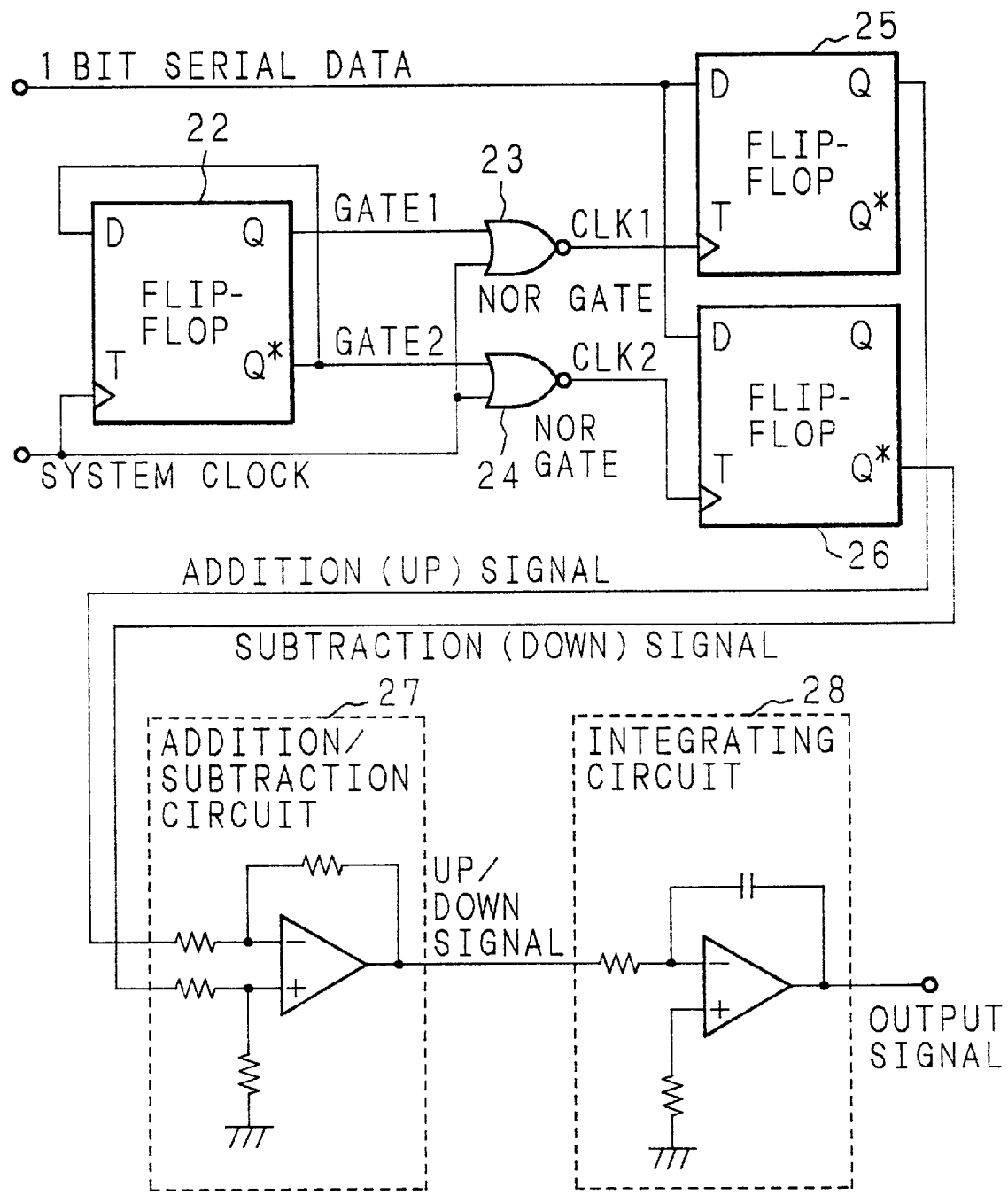
FIG. 6 is a block diagram showing a structural example of a one-bit digital/analog converter.
Figure 7:
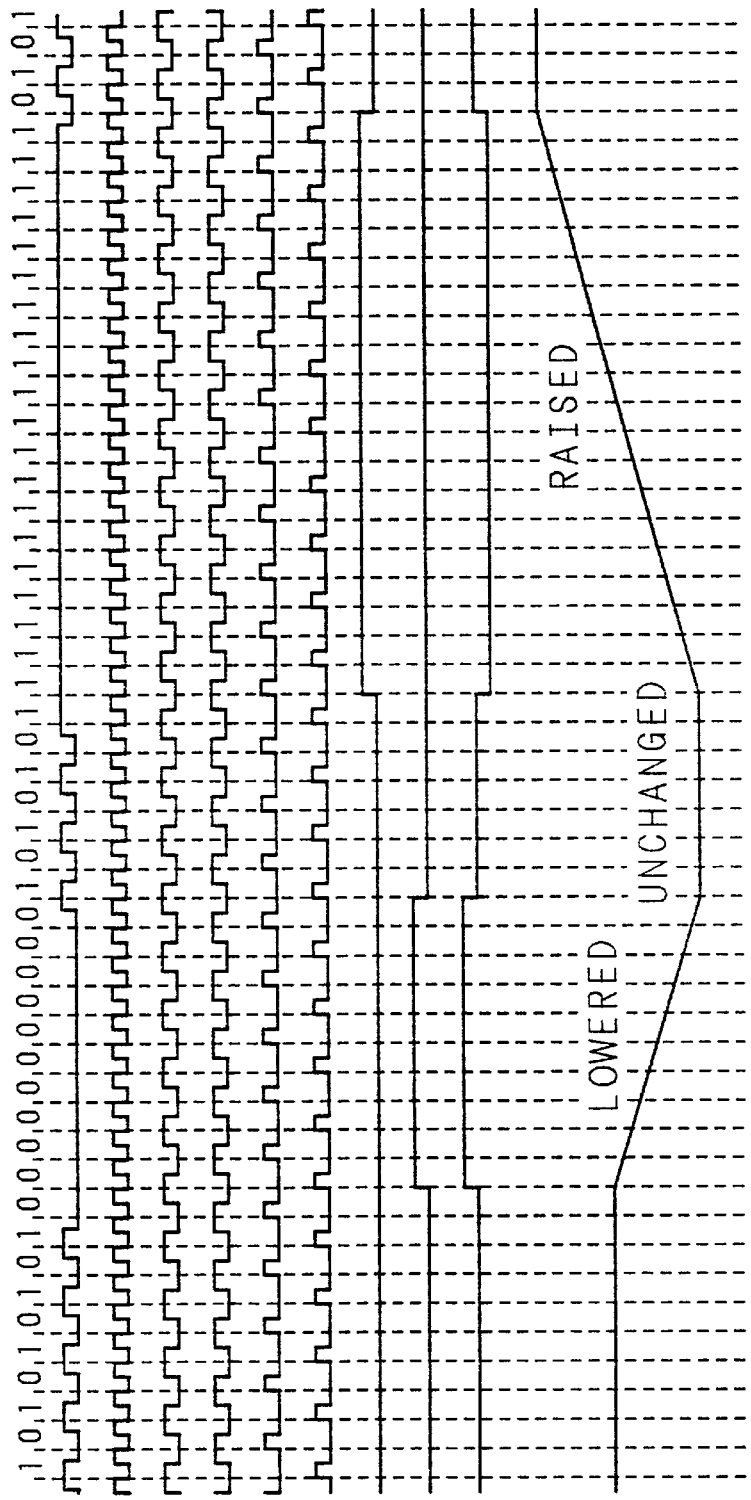
FIGS. 7A to 7J are timing charts showing the relation of signals at respective points of the digital image correction device of the invention.

FIG. 6 is a block diagram showing a structural example of the one-bit digital/analog converter 18. This one-bit digital/analog converter 18 comprises a flip-flop 22 for receiving the system clock and outputting opposite phase gate signals GATE 1 and GATE 2, a NOR gate 23 for receiving the phase gate signal GATE 1 and system clock and outputting a timing signal CLK 1, a NOR gate 24 for receiving the phase gate signal GATE 2 and system clock and outputting a timing signal CLK 2, a flip-flop 25 for latching the bit serial data from the one-bit latch circuit 17 by the timing signal CLK 1, and a flip-flop 26 for latching the bit serial data from the one-bit latch circuit 17 by the timing signal CLK 2, and inverting and outputting the bit serial data.

The one-bit digital/analog converter 18 further comprises an operational amplifier for receiving the signal latched by the flip-flop 25 and output as an addition (UP) signal as an inverted input, and receiving the signal latched by the flip-flop 26 and output as a subtraction (DOWN) signal as a non-inverted input, an addition/subtraction circuit 27 for outputting an UP/DOWN signal which is H level while the subtraction (DOWN) signal is at H level and is L level while the addition (UP) signal is at H level, an operational amplifier operating by receiving the UP/DOWN signal output by the addition/subtraction circuit 27 as an inverted input, and an integrating circuit 28 for outputting an analog signal of a lower voltage level while the UP/DOWN signal is at H level and of a higher voltage level while the UP/DOWN signal is at L level.

FIGS. 7A to 7J are timing charts showing the relation of the above bit serial data (7A), system clock (7B), phase gate signal GATE 1 (7C), phase gate signal GATE 2 (7D), timing signal CLK 1 (7E), timing signal CLK 2 (7F), addition (UP) signal (7G), subtraction (DOWN) signal (7H), UP/DOWN signal (7I), and analog output signal (7J) output by the integrating circuit 28. Referring now to the timing charts, the operation of the one-bit digital/analog converter 18 is described below.

The flip-flop 22 receives the system clock (7B), and outputs opposite phase gate signals GATE 1 (7C) and GATE 2 (7D), having a double cycle of the system clock.

The NOR gates 23, 24 issue timing signals CLK 1 (7E), CLK 2 (7F), having same pulse width as the system clock, and mutually deviated by a half cycle (=1 cycle of the system clock).

The flip-flops 25, 26 respectively latch the adjacent one bits of the serial data (7A) from the one-bit latch circuit 17 by the timing signals CLK 1 (7E), CLK 2 (7F).

Herein, possible combinations (relation patterns) of the adjacent one-bit data of the serial data (a) are "11", "00", "10" and "01".

When the combination of the adjacent one-bit data latched by the flip-flops 25, 26 is "11", the addition (UP) signal (7G) is "1", the subtraction (DOWN) signal (7H) is "0", so that the addition/subtraction signal 27 outputs an UP/DOWN signal of "−1 level". At this time, the analog output signal (7J) output by the integrating circuit 28 is raised.

When the combination of the adjacent one-bit data latched by the flip-flops 25, 26 is "00", the addition (UP) signal (7G) is "0", the subtraction (DOWN) signal (7H) is "1", so that the addition/subtraction signal 27 outputs an UP/DOWN signal of "+1 level". At this time, the analog output signal (7J) output by the integrating circuit 28 is lowered.

When the combination of the adjacent one-bit data latched by the flip-flops 25, 26 is "10", the addition (UP) signal (7G) is "1", the subtraction (DOWN) signal (7H) is "1", so that the addition/subtraction signal 27 outputs an UP/DOWN signal of "0 level". At this time, the analog output signal (7J) issued by the integrating circuit 28 is unchanged.

When the combination of the adjacent one-bit data latched by the flip-flops 25, 26 is "01", the addition (UP) signal (7G) is "0", the subtraction (DOWN) signal (7H) is "0", so that the addition/subtraction signal 27 outputs an UP/DOWN signal of "0 level". At this time, the analog output signal (7J) output by the integrating circuit 28 is unchanged.

Therefore, by the combination (relation pattern) of the adjacent one-bit data of the serial data (7A) from the one-bit latch circuit 17, the convergence correction amount of the convergence correction point (the change of correction amount at adjacent convergence correction points can be expressed in one bit) can be determined.

Thus, since the convergence correction data required at the convergence correction points corresponding one by one to the positions on the CRT screen is stored in the memory as one-bit UP/DOWN data, so that when storing convergence correction data of all of odd and even fields into the memory 16 to generate convergence correction signal having a desired waveform level at each convergence correction point, as compared with the prior art of using the 8-bit width memory and digital/analog converter, the necessary memory capacity can be substantially curtailed to 1/bit width =⅛. Therefore, the electronic circuit for reducing the necessary memory capacity is not necessary, and a digital image correction device of low cost parts is realized.

[Embodiment 2]

Figure 8:
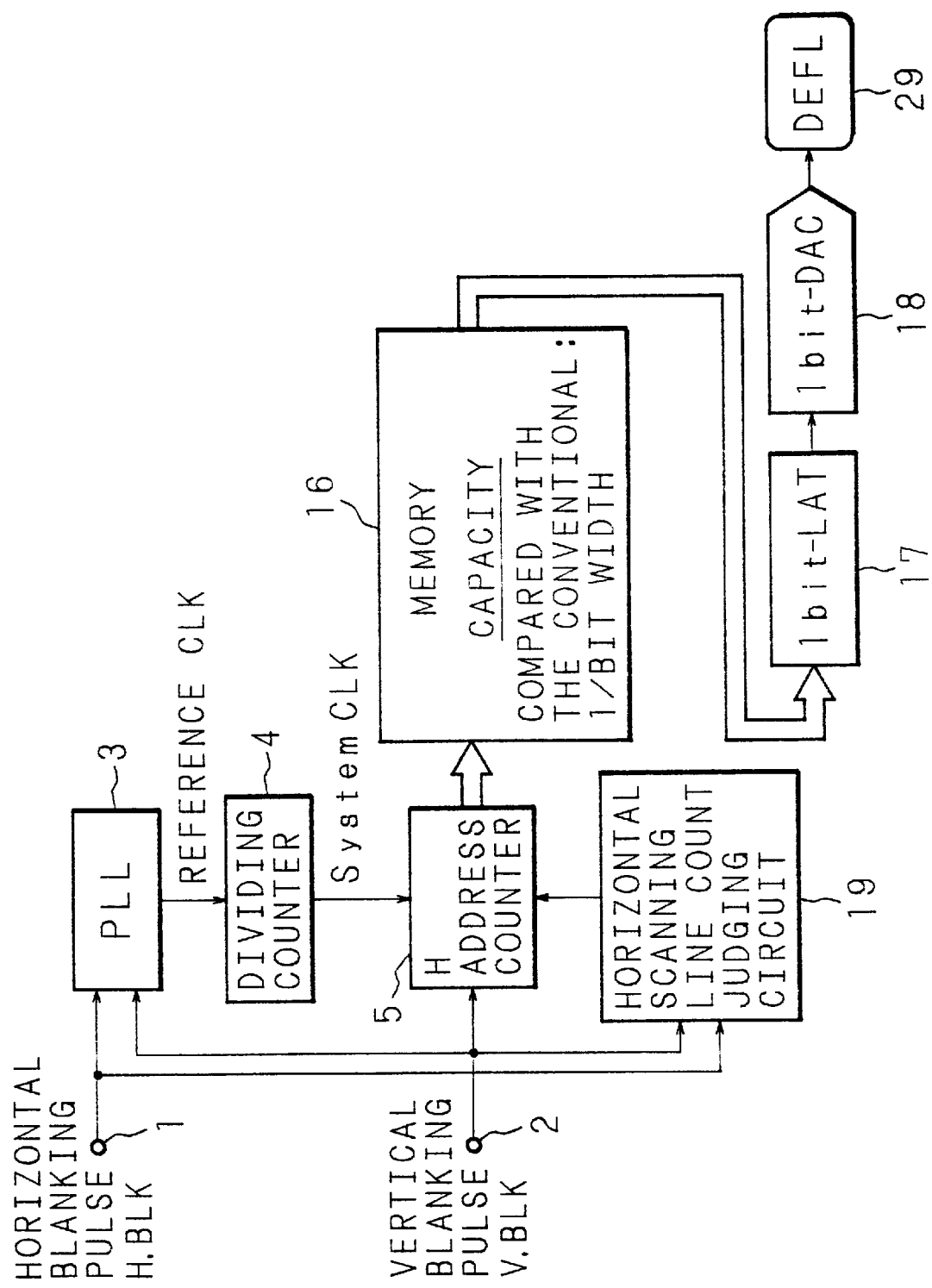
FIG. 8 is a block diagram showing a constitution of a second embodiment of a digital image correction device of the invention.

FIG. 8 is a block diagram showing a constitution of a second embodiment of a digital image correction device of the invention. This digital image correction device is a digital image correction device for correcting graphic distortion, and the LPF 13, amplifier 14, and CY coil 15 are excluded from the block diagram shown in FIG. 3, it is designed to supply the analog output signal output by the one-bit digital/analog converter 18 directly into a control terminal of a deflection control unit (DEFL) 29 for correcting the graphic distortion. In the memory 16, the graphic distortion correction amount required at each point on the CRT screen is stored as one-bit data at every point.

In such digital image correction device, the graphic distortion correction data at the correction points corresponding one by one to the positions on the CRT screen is read out from the memory 16, and is fed to the deflection control unit 29. The deflection control unit 29 controls the current flowing in a deflecting coil on the basis of the fed graphic distortion correction data at every correction point, and corrects the uncorrected raster form as shown in FIG. 9A dynamically to the raster from as shown in FIG. 9B.

The other constitution and operation are same as the constitution and operation of the digital image correction device explained in the first embodiment, and the description is omitted.

Thus, since the graphic distortion correction data necessary at the graphic distortion correction points corresponding one by one to the positions on the CRT screen is stored in the memory 16 as one-bit UP/DOWN data, so that when storing graphic distortion correction data of all of odd and even fields into the memory 16 to generate graphic distortion correction signal having a desired waveform level at each graphic distortion correction point, as compared with the prior art of using the 8-bit width memory and digital/analog converter, the memory capacity can be substantially curtailed to 1/bit width=⅛. Therefore, the electronic circuit for reducing the necessary memory capacity is not necessary, and a digital image correction device of low cost parts is realized.

[Embodiment 3]

FIG. 10 is a block diagram showing a constitution of a third embodiment of a digital image correction device of the invention. This digital image correction device is a digital image correction device for correcting white balance and uneven luminance, and the LPF 13 amplifier 14, and CY coil 15 are excluded from the block diagram shown in FIG. 3, it is designed to supply the analog output signal output by the one-bit digital/analog converter 18 directly into a control terminal of a video correction unit (VIDEO) 30 for correcting the white balance and uneven luminance. In the memory 16, the correction amount of white balance and uneven luminance required at each point on the CRT screen is stored as one-bit data at every point.

In such digital image correction device, the luminance and contrast of three primaries of red, green and blue at each point on the CRT screen, and the correction data of luminance and contrast of three primaries of red, green and blue at the correction points corresponding one by one to the positions on the CRT screen are read out from the memory 16, and are fed to the video correction unit 30. The video correction unit 30 corrects dynamically the luminance and contrast of three primaries of red, green and blue, at each point on the CRT screen, on the basis of the fed correction data of luminance and contrast of three primaries of red, green and blue at every control point.

The other constitution and operation are same as the constitution and operation of the digital image correction device explained in the first embodiment, and the description is omitted.

Thus, since the correction data of white balance and uneven luminance necessary at the correction points of white balance and uneven luminance corresponding one by one to the positions on the CRT screen is stored in the memory 16 as one-bit UP/DOWN data, so that when storing correction data of white balance and uneven luminance of all of odd and even fields into the memory 16 to generate correction signal of white balance and uneven luminance having a desired waveform level at each correction point of white balance and uneven luminance, as compared with the prior art of using the 8-bit width memory and digital/analog converter, the necessary memory capacity can be substantially curtailed to 1/bit width=⅛. Therefore, the electronic circuit for reducing the necessary memory capacity is not necessary, and a digital image correction device of low cost parts is realized.

[Embodiment 4]

FIG. 11 is a block diagram showing a constitution of a fourth embodiment of a digital image correction device of the invention. This digital image correction device is a digital image correction device for correcting the focus (the current flowing in the focus coil), and the amplifier 14 in the block diagram shown in FIG. 3 is replaced by a focus coil driving amplifier 31, and CY coil 15 in FIG. 3 by a focus coil 32. In the memory 16, the focus correction amount required at each point on the CRT screen is stored as one-bit data at every point.

In such digital image correction device, the focus correction data at the correction points corresponding one by one to the positions on the CRT screen is read out from the memory 16.

The focus correction data of 1 byte being read out is converted into bit serial data in the one-bit latch circuit 17, and is converted from the UP/DOWN data into analog data in the one-bit digital/analog converter 18.

The analog data converted by the one-bit digital/analog converter 18 are interpolated by the LPF 13 to be a continuous focus correction signal, which is amplified by the focus coil driving amplifier 31, and is supplied into the focus coil 32.

As a result, in the CRT, the focus coil correction magnetic field for correcting the focus at each point on the screen is generated from the focus coil 32, and the focus (the current flowing in the focus coil) at each point on the CRT screen is corrected.

The other constitution and operation are same as the constitution and operation of the digital image correction device explained in the first embodiment, and the description is omitted.

Thus, since the focus correction data necessary at the focus correction points corresponding one by one to the positions on the CRT screen is stored in the memory 16 as one-bit UP/DOWN data, so that when storing focus correction data of all of odd and even fields into the memory 16 to generate focus correction signal having a desired waveform level at each focus correction point, as compared with the prior art of using the 8-bit width memory and digital/analog converter, the necessary memory capacity can be substantially curtailed to 1/bit width=⅛. Therefore, the electronic circuit for reducing the necessary memory capacity is not necessary, and a digital image correction device of low cost parts is realized.

[Embodiment 5]

Figure 12:
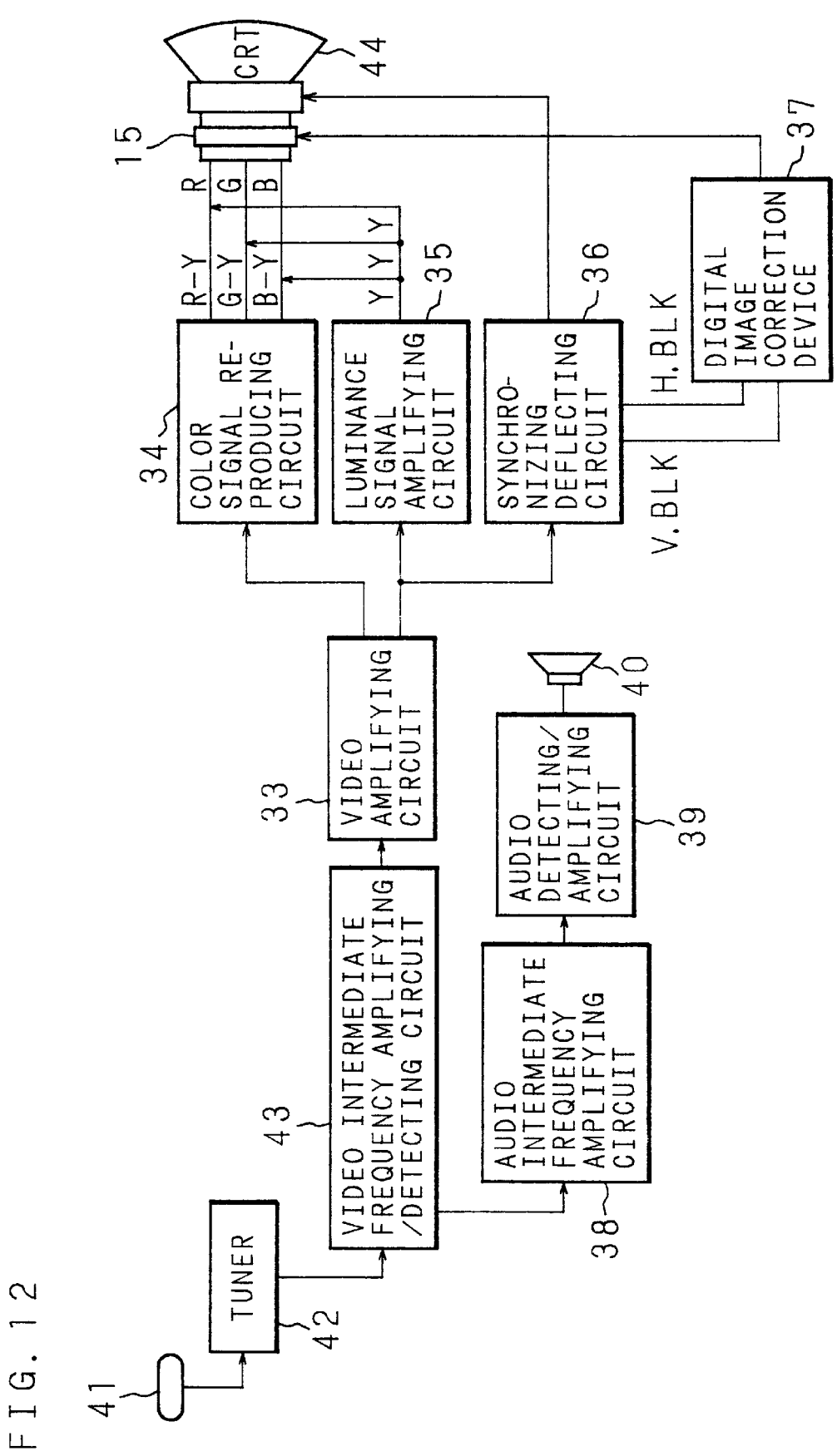
FIG. 12 is a block diagram showing a constitution of a fifth embodiment of a display device of the invention.

FIG. 12 is a block diagram showing a constitution of a fifth embodiment of a display device of the invention. This display device is a color television receiver, in which the color television wave received from an antenna 41 is selectively amplified by a tuner 42, and is converted into an intermediate frequency signal, and is sent into a video intermediate frequency amplifying/detecting circuit 43. The intermediate frequency signal is amplified in the video intermediate frequency amplifying/detecting circuit 43, and separated into color television signal and audio intermediate frequency signal. The audio intermediate frequency signal is amplified in an audio intermediate frequency amplifying circuit 38, and the audio signal is detected and amplified by an audio detecting/amplifying circuit 39, and is issued through a speaker 40.

The color television signal is amplified in a video amplifying circuit 33, and is separated into carrier color signal C and luminance signal Y, and the carrier color signal C is sent into a color signal reproducing circuit 34, while the luminance signal Y is sent into a luminance signal amplifying circuit 35 and into a synchronizing/deflecting circuit 36. In the color signal reproducing circuit 34, from the carrier color signal C, color difference signals R-Y, G-Y, B-Y are reproduced and issued. The color difference signals R-Y, G-Y, B-Y are combined with the luminance signal Y amplified in the luminance signal amplifying circuit 35 to become color signals R, G, B, respectively, which are fed into a CRT 44. In the CRT 44, color signals R, G, B become electron beams depending on their intensity.

The synchronizing/deflecting circuit 36 gives the horizontal blanking pulse H. BLK and vertical blanking pulse V. BLK to the digital image correction device 37. The other constitution and operation are same as the constitution and operation of the digital image correction device explained in the first embodiment, and the description is omitted.

Thus, since the digital image correction device 37 of low cost parts is used, an inexpensive display device can be realized.

As the invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A digital image correction device for correcting an image at image correction points respectively corresponding to positions on a CRT screen displayed by raster scanning system, comprising:

a memory storing correction data for correcting the image at an image correction point as a relation pattern indicating the relative relation by one-bit data with the correction data at the adjacent image correction point which is scanned previous to each image correction point;

a reading circuit for reading out the correction data from the memory in synchronism with raster scanning on the screen;

a correction signal generating circuit for generating a correction signal at the image correction point, on the basis of the relation pattern of the correction data being read by the reading circuit; and a correction circuit for correcting the image on the basis of the correction signal generated by the correction signal generating circuit.

2. A digital image correction device of claim 1, wherein said memory stores the specific number of one-bit data as parallel data, said reading circuit has a memory circuit for storing temporarily the parallel data output from the memory and outputting as bit serial data, and said correction signal generating circuit includes:

a timing signal generating circuit for generating two timing signals for respectively latching one-bit data of adjacent correction points of the bit serial data output from the memory circuit, on receiving a clock used in reading by said reading circuit;

two latch circuits for respectively latching the one-bit data of the adjacent correction points, by the timing signals generated by the timing signal generating circuit;

a boosting/lowering signal output circuit for outputting a voltage signal for boosting, lowering or holding the correction signal voltage, on the basis of the relative relation of the one-bit data of the adjacent correction points latched by the two latch circuits; and an integrating circuit for outputting the correction signal voltage by boosting, lowering or holding, by integrating the voltage signal output from the boosting/lowering signal output circuit.

3. A digital image correction device of claim 1, wherein said reading circuit comprises a horizontal scanning line count judging circuit for judging the number of horizontal scanning lines, and reads out the correction data corresponding to each horizontal scanning line of the judged number of horizontal scanning lines from the memory by duplicating or decimating, on the basis of the relation between the number of horizontal scanning lines judged by the horizontal scanning line count judging circuit, and the number of horizontal scanning lines per frame of the memory storing the correction data of the frame.

4. A display device comprising a digital image correction device of claim 1.

5. A digital image correction device for correcting the convergence at convergence correction points respectively corresponding to positions on a CRT screen displayed by raster scanning system, comprising:

- a memory storing convergence correction data for correcting the convergence at a convergence correction point as a relation pattern indicating the relative relation by one-bit data with the convergence correction data at the adjacent convergence correction point which is scanned previous to each convergence correction point;
- a reading circuit for reading out the convergence correction data from the memory in synchronism with raster scanning on the screen;
- a correction signal generating circuit for generating a convergence correction signal at the convergence correction point, on the basis of the relation pattern of the convergence correction data being read by the reading circuit; and
- a correction magnetic field generating circuit for generating a convergence correction magnetic field for correcting the convergence on the basis of the convergence correction signal generated by the correction signal generating circuit.

6. A digital image correction device of claim 5, wherein said memory stores the specific number of one-bit data as parallel data, said reading circuit has a memory circuit for storing temporarily the parallel data output from the memory and outputting as bit serial data, and said correction signal generating circuit includes:

- a timing signal generating circuit for generating two timing signals for respectively latching one-bit data of adjacent correction points of the bit serial data output from the memory circuit, on receiving a clock used in reading by the reading circuit;
- two latch circuits for respectively latching the one-bit data of the adjacent correction points, by the timing signals generated by the timing signal generating circuit;
- a boosting/lowering signal output circuit for outputting a voltage signal for boosting, lowering or holding the correction signal voltage, on the basis of the relative relation of the one-bit data of the adjacent correction points latched by the two latch circuits; and
- an integrating circuit for outputting the correction signal voltage by boosting, lowering or holding, by integrating the voltage signal output from the boosting/lowering signal output circuit.

7. A digital image correction device of claim 5, wherein said reading circuit comprises a horizontal scanning line count judging circuit for judging the number of horizontal scanning lines, and reads out the correction data corresponding to each horizontal scanning line of the judged number of horizontal scanning lines from the memory by duplicating or decimating, on the basis of the relation between the number of horizontal scanning lines judged by the horizontal scanning line count judging circuit, and the number of horizontal scanning lines per frame of the memory storing the convergence correction data of the frame.

8. A display device comprising a digital image correction device of claim 5.

9. A digital image correction device for correcting the graphic distortion at graphic distortion correction points respectively corresponding to positions on a CRT screen displayed by raster scanning system, comprising:

- a memory storing graphic distortion correction data for correcting the graphic distortion at a graphic distortion correction point as a relation pattern indicating the relative relation by one-bit data with the graphic distortion correction data at the adjacent graphic distortion correction point which is scanned previous to each graphic distortion correction point;
- a reading circuit for reading out the graphic distortion correction data from the memory in synchronism with raster scanning on the screen;
- a correction signal generating circuit for generating a graphic distortion correction signal at the graphic distortion correction point, on the basis of the relation pattern of the graphic distortion correction data being read by the reading circuit; and
- a correction magnetic field generating circuit for generating a graphic distortion correction magnetic field for correcting the graphic distortion on the basis of the graphic distortion correction signal generated by the correction signal generating circuit.

10. A digital image correction device of claim 9, wherein said memory stores the specific number of one-bit data as parallel data, said reading circuit has a memory circuit for storing temporarily the parallel data output from the memory and outputting as bit serial data, and said correction signal generating circuit includes:

- a timing signal generating circuit for generating two timing signals for respectively latching one-bit data of adjacent correction points of the bit serial data output from the memory circuit, on receiving a clock used in reading by the reading circuit;
- two latch circuits for respectively latching the one-bit data of the adjacent correction points, by the timing signals generated by the timing signal generating circuit;
- a boosting/lowering signal output circuit for outputting a voltage signal for boosting, lowering or holding the correction signal voltage, on the basis of the relative relation of the one-bit data of the adjacent correction points latched by the two latch circuits; and
- an integrating circuit for outputting the correction signal voltage by boosting, lowering or holding, by integrating the voltage signal output from the boosting/lowering signal output circuit.

11. A digital image correction device of claim 9, wherein said reading circuit comprises a horizontal scanning line count judging circuit for judging the number of horizontal scanning lines, and reads out the correction data corresponding to each horizontal scanning line of the judged number of horizontal scanning lines from the memory by duplicating or decimating, on the basis of the relation between the number of horizontal scanning lines judged by the horizontal scanning line count judging circuit, and the number of horizontal scanning lines per frame of the memory storing the graphic distortion correction data of the frame.

12. A display device comprising a digital image correction device of claim 9.

13. A digital image correction device for correcting the white balance and uneven luminance at white balance and uneven luminance correction points respectively corresponding to positions on a CRT screen displayed by raster scanning system, comprising:

a memory storing white balance and uneven luminance correction data for correcting the white balance and uneven luminance at a white balance and uneven luminance correction point as a relation pattern indicating the relative relation by one-bit data with the white balance and uneven luminance correction data at the adjacent white balance and uneven luminance correction point which is scanned previous to each white balance and uneven luminance correction point;

a reading circuit for reading out the white balance and uneven luminance correction data from the memory in synchronism with raster scanning on the screen;

a correction signal generating circuit for generating a white balance and uneven luminance correction signal at the white balance and uneven luminance correction point, on the basis of the relation pattern of the white balance and uneven luminance correction data being read by the reading circuit; and a video correction unit for correcting the white balance and uneven luminance, on the basis of the correction signal of white balance and uneven luminance generated by the correction signal generating circuit.

14. A digital image correction device of claim 13, wherein said memory stores the specific number of one-bit data as parallel data, said reading circuit has a memory circuit for storing temporarily the parallel data output from the memory and outputting as bit serial data, and said correction signal generating circuit includes:

a timing signal generating circuit for generating two timing signals for respectively latching one-bit data of ajacent correction points of the bit serial data output from the memory circuit, on receiving a clock used in reading by the reading circuit;

two latch circuits for respectively latching the one-bit data of the adjacent correction points, by the timing signals generated by the timing signal generating circuit;

a boosting/lowering signal output circuit for outputting a voltage signal for boosting, lowering or holding the correction signal voltage, on the basis of the relative relation of the adjacent one-bit data latched by the two latch circuits; and an integrating circuit for outputting the correction signal voltage by boosting, lowering or holding, by integrating the voltage signal output from the boosting/lowering signal output circuit.

15. A digital image correction device of claim 13, wherein said reading circuit comprises a horizontal scanning line count judging circuit for judging the number of horizontal scanning lines, and reads out the correction data corresponding to each horizontal scanning line of the judged number of horizontal scanning lines from the memory by duplicating or decimating, on the basis of the relation between the number of horizontal scanning lines judged by the horizontal scanning line count judging circuit, and the number of horizontal scanning lines per frame of the memory storing the white balance and uneven luminance correction data of the frame.

16. A display device comprising a digital image correction device of claim 13.

17. A digital image correction device for correcting the focus at focus correction points respectively corresponding to positions on a CRT screen displayed by raster scanning system, comprising:

a memory storing focus correction data for correcting the focus at a focus correction point as a relation pattern indicating the relative relation by one-bit data with the focus correction data at the adjacent focus correction point which is scanned previous to each focus correction point;

a reading circuit for reading out the focus correction data from the memory in synchronism with raster scanning on the screen;

a correction signal generating circuit for generating a focus correction signal at the focus correction point, on the basis of the relation pattern of the focus correction data being read by the reading circuit; and a correction magnetic field generating circuit for generating a focus correction magnetic field for correcting the focus on the basis of the focus correction signal generated by the correction signal generating circuit.

18. A digital image correction device of claim 17, wherein said memory stores the specific number of one-bit data as parallel data, said reading circuit has a memory circuit for storing temporarily the parallel data output from the memory and outputting as bit serial data, and said correction signal generating circuit includes:

a timing signal generating circuit for generating two timing signals for respectively latching one-bit data of adjacent correction points of the bit serial data output from the memory circuit, on receiving a clock used in reading by the reading circuit;

two latch circuits for respectively latching the one-bit data of the adjacent correction points, by the timing signals generated by the timing signal generating circuit;

a boosting/lowering signal output circuit for outputting a voltage signal for boosting, lowering or holding the correction signal voltage, on the basis of the relative relation of the adjacent one-bit data latched by the two latch circuits; and an integrating circuit for outputting the correction signal voltage by boosting, lowering or holding, by integrating the voltage signal output from the boosting/lowering signal output circuit.

19. A digital image correction device of claim 17, wherein said reading circuit comprises a horizontal scanning line count judging circuit for judging the number of horizontal scanning lines, and reads out the correction data corresponding to each horizontal scanning line of the judged number of horizontal scanning lines from the memory by duplicating or decimating, on the basis of the relation between the number of horizontal scanning lines judged by the horizontal scanning line count judging circuit, and the number of horizontal scanning lines per frame of the memory storing the focus correction data of the frame.

20. A display device comprising a digital image correction device of claim 17.

* * * * *